(12) United States Patent
Nomura et al.

(10) Patent No.: US 7,948,553 B2
(45) Date of Patent: May 24, 2011

(54) DIGITAL CAMERA HAVING SEQUENTIAL SHOOTING MODE

(75) Inventors: Koji Nomura, Yamato (JP); Yoji Watanabe, Fuchu (JP)

(73) Assignee: Olympus Imaging Corp., Tokyo (JP)

( * ) Notice: Subject to any disclaimer, the term of this patent is extended or adjusted under 35 U.S.C. 154(b) by 463 days.

(21) Appl. No.: 11/880,352

(22) Filed: Jul. 20, 2007

(65) Prior Publication Data

US 2008/0024650 A1    Jan. 31, 2008

(30) Foreign Application Priority Data

Jul. 28, 2006   (JP) ................................. 2006-207178
Apr. 12, 2007   (JP) ................................. 2007-104831

(51) Int. Cl.
    *G03B 13/00*       (2006.01)
(52) U.S. Cl. ........ 348/345; 348/350; 348/348; 396/125; 396/374; 396/429
(58) Field of Classification Search .................. 348/345, 348/348; 396/125, 374, 429
    See application file for complete search history.

(56) References Cited

U.S. PATENT DOCUMENTS

| 7,006,140 B2 | 2/2006 | Shono | |
|---|---|---|---|
| 2004/0155976 A1 | 8/2004 | Suda | |
| 2006/0029380 A1 * | 2/2006 | Taka | 396/125 |

FOREIGN PATENT DOCUMENTS

| JP | 2001275033 A | * 10/2001 |
|---|---|---|
| JP | 2003-209720 | 7/2003 |

OTHER PUBLICATIONS

Chinese Office Action to Chinese Patent Application No. 200710136134.6, mailed on Oct. 10, 2008 (3 pgs.) (with English Translation (2 pgs.)).

\* cited by examiner

*Primary Examiner* — Nhan T Tran
*Assistant Examiner* — Yih-Sien Kao
(74) *Attorney, Agent, or Firm* — John C. Pokotylo; Straub & Pokotylo

(57) ABSTRACT

A digital camera comprises a CCD for subjecting subject light flux incident from a photographing lens to photoelectric conversion and outputting subject image signals, a movable mirror section, arranged in the imaging light path of the CCD, for reflecting some of the subject light flux and transmitting the remainder, a range finder/photosensor for receiving subject light flux reflected by the movable mirror member and carrying out ranging integration, and an optical system drive mechanism for carrying out focal point adjustment of the photographing lens based on output of the range finder/photosensor. In a sequential shooting mode for sequentially acquiring images using the CCD, during the imaging operation by the CCD ranging integration by the range finder/photosensor 217 is carried out using subject light flux that has been reflected by the movable mirror member.

8 Claims, 11 Drawing Sheets

DIGITAL CAMERA HAVING SEQUENTIAL SHOOTING MODE

Benefit is claimed, under 35 U.S.C. §119, to the filing date of prior Japanese Patent Applications No. 2006-207178, filed on Jul. 28, 2006 and No. 2007-104831, filed on Apr. 12, 2007. These applications are expressly incorporated herein by reference. The scope of the present invention is not limited to any requirements of the specific embodiments described in the application.

BACKGROUND OF THE INVENTION

1. Field of the Invention

The present invention relates to a digital camera having a sequential shooting mode.

2. Description of the Related Art

Currently, digital cameras, and in particular digital single lens reflex cameras, are configured with a movable mirror that is retracted from an exposure light path at the time of exposure, and returned back into the exposure optical path again once exposure is completed. Accordingly, when a sequential shooting operation (so called continuous shooting) is carried out, the retraction and returning operations of the movable mirror are an obstacle to increasing the sequential shooting speed. With respect to this problem, with a digital single lens reflex camera disclosed in Japanese patent laid-open No. 2003-209720 (laid-open Jul. 25, 2003), a state where the movable mirror is retracted from the exposure light path is maintained during sequential shooting, and taken images are displayed like a moving image on a display device provided within the viewfinder.

SUMMARY OF THE INVENTION

The digital camera of the present invention, having a sequential shooting mode, comprising: a photographing lens; an optical member for guiding subject light flux that has passed through the photographing lens in a first direction and a second direction; an imaging section for photoelectrically converting first subject light flux that has been conveyed in the first direction and outputting subject image signals; an image processing section for processing the subject image signals to generate image data; a memory for storing the image data; a focal point detection section for detecting a focal point of the photographing lens based on second subject light flux that has been conveyed in the second direction; a focal point adjustment section for carrying out focal point adjustment of the photographing lens based on output of the focal point detection section; and a control section for, in a sequential shooting mode, activating the focal point detection section for a subsequent exposure operation in parallel with a photoelectrical conversion operation by the imaging section.

DETAILED DESCRIPTION OF THE PREFERRED EMBODIMENTS

In the following, preferred embodiments using a digital single lens reflex camera adopting the present invention will be described using the drawings. A digital single lens reflex camera of a first embodiment of the present invention has a so-called live view function (also called an electronic viewfinder function) for forming a subject image formed by a photographing lens on an image sensor, and displaying a moving image for subject observation on a display device such as a liquid crystal monitor based on output of the image sensor. It is also possible to set a normal single frame shooting mode and a sequential shooting mode. In the sequential shooting mode, it is possible to set a speed priority sequential shooting mode where priority is given to making the sequential shooting speed fast, and an image quality priority sequential shooting mode where priority is given to quality of the stored image. These single frame mode, speed priority sequential shooting mode and image quality sequential shooting mode can be carried out by means of menu settings, which will be described later. Also, the photographing lens performs automatic focal point adjustment using TTL (Through The Lens) phase different detection AF (Auto Focus).

Figure 1:
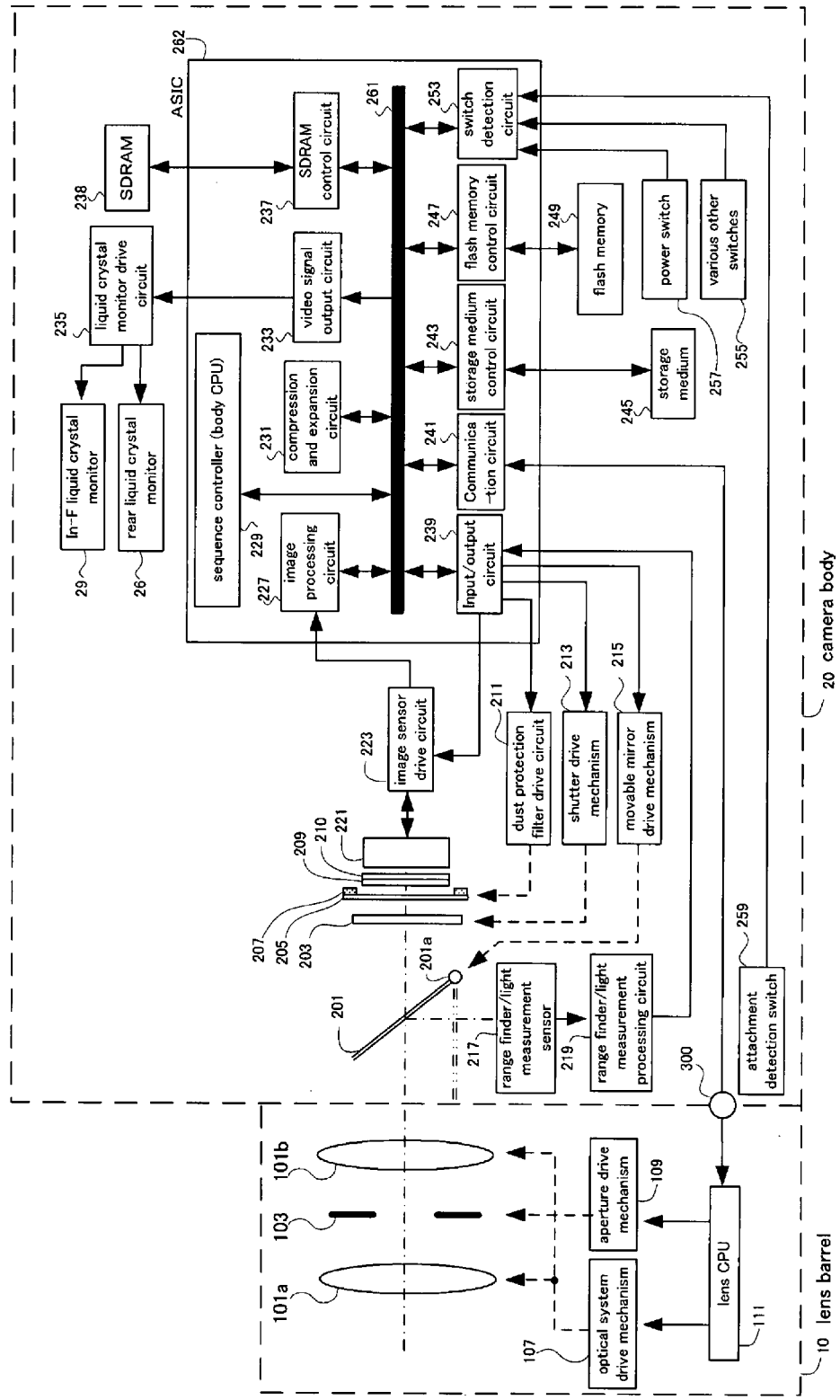
FIG. 1 is a block diagram showing the overall structure of electrical systems of a digital camera of a first embodiment adopting the present invention.

FIG. 1 is a block diagram concentrating on the electrical systems of a digital camera relating to embodiments of the present invention. The lens barrel 10 is removably attached to mount opening section (not shown) on the front of the camera body 20. Subject light flux that is formed by a photographing lens comprised of lenses 101a, 101b etc. within the lens barrel 10 is guided into the camera body 20 by means of the mount opening section. With this embodiment, the lens barrel 10 and the camera body 20 are constructed separately, and the two are electrically connected by means of a communication contact 300. Also, an attachment/removal sensor switch 259 provided on the camera body 20 functions to detect an attachment state of the lens barrel 10.

Lenses 101a and 101b for focal point adjustment and focal length adjustment, and an aperture 103 for adjusting aperture, are arranged inside the lens barrel 10. The lens 101a and the lens 101b are driven by an optical system drive mechanism 107, while the aperture 103 is driven by the aperture drive mechanism 109. The optical system drive mechanism 107 and the aperture drive mechanism 109 are respectively connected to a lens CPU 111, and this lens CPU 111 is connected to the camera body 20 by means of the communication contact 300. The lens CPU 111 performs control inside of the lens barrel 10, and specifically performs focusing control together with the optical system drive mechanism 107 as a focal point adjustment section, and performs aperture control together with the aperture drive mechanism 109 as an aperture adjustment section.

An optical member functioning as a beam splitter for causing subject light flux that has passed through the lenses 101a and 101b to branch in a first direction and a second direction is arranged inside a mirror box within the camera body 20. This optical member is a plate glass mirror with a thickness of 0.2 mm or less having characteristics to pass some of the light flux, for example, and reflect the remainder. This movable mirror member 201 is driven by a mirror drive mechanism 215, and is capable of rotation along an axis orthogonal to the surface of the drawing about a rotational axis 201a. When the movable mirror member is at a position inclined at 45 degrees with respect to the optical path of the lenses 101a, 101b (the position shown by a solid line in FIG. 1), some of the subject light flux (for example, 30%) is reflected, and guided to a rangefinder/light measurement sensor 217 provided in a base section of the camera body 20. Also, the remaining subject light flux (for example 70%) passes through the movable mirror member 201 and is guided in the direction of the CCD 221.

Then, when the movable mirror member 201 is at a retracted position where it does not block the subject light flux (position shown by the two-dot dashed line in FIG. 1) and substantially parallel to the optical path of the lenses 100a and 101b, all of the subject light flux is conveyed to the CCD 221. The structure of the movable mirror member 201 will be described later using FIG. 2. In this embodiment, the rotational center of the movable mirror member 201 is at a lower side inside the mirror box, but this is not limiting, and it can also be at the upper side, and obviously it does not matter even if the rotational center is on the left or right side of the lens looking from the front of the camera Also, the rotational center of the movable mirror member 201 is arranged at the CCD 221 side, but this is not limiting and there is no problem in arranging the movable mirror member 201 at the mount opening side, Further in this embodiment, the reflectance and transmissivity of the half mirror are 30% and 70% respectively, but this ratio is not limiting and can be appropriately changed.

The range-finder/photosensor 217, constituting part of a focal point detection section, is arranged in a base section of the mirror box inside the camera body 20, at a position where second light flux reflected in the second direction by the movable mirror member 201 is conveyed to it. This rangefinder/photosensor 217 is comprised of a sensor for range finding and a photosensor, with the photosensor being divided into a plurality of photosensor elements for dividing a subject image and performing light measurements. Also, the range finding sensor is a sensor for carrying out ranging using a TTL phase difference detecting method. Output of the range-finder/photosensor 217 is transmitted to a ranging/light measurement processing circuit 219. The range ranging/light measurement processing circuit 219 outputs evaluated light measurement values based on output of the photosensor, and amount of focal point slip of the subject image imaged by the lenses 101a and 101b is measured based on the output of the range finding sensor. Incidentally, it is also possible for the range finding sensor and the photosensor to be formed separately, or to be formed in an integrated manner.

A focal plane type shutter 203, for exposure time control and shielding the CCD 221, is arranged on the photographing light path, behind the movable mirror member 201 (first direction described above) and on the optical axis of the lenses 101a and 101b, and drive control for this shutter 203 is performed by a shutter drive mechanism 213. A dust protection filter 205 is arranged behind the shutter 203, and the dust protection filter 205 prevents dust that has been generated in the mount opening section of the camera body and inside the body becoming attached to the CCD 221 and the image sensor, and shadows of the dust appearing in the subject image, thus degrading appearance.

A piezoelectric element 207 is fixed to the whole or part of the peripheral edge of the dust protection filter 205, and this piezoelectric element 207 is connected to a dust protection filter drive circuit 211. The piezoelectric element 207 is driven by the dust protection filter drive circuit 211 so that the dust protection filter 205 vibrates at a specified ultrasonic frequency, and any dust attached to the front surface of the dust protection filter 205 is removed using this vibration. Incidentally, as long as it is possible to remove dust that has become attached to the imaging element itself, such as the CCD, or optical elements arranged at the front surface side of the image sensor, use of the ultrasonic vibration as in this embodiment is not limiting, and there is no problem in using various alternative methods as appropriate, such as a method of brushing off dust with air flow using an air pump or the like, or collecting and removing dust using static electricity.

An infra-red cut filter 209 for cutting an infrared light component from the subject light flux is arranged behind the dust protection filter 205, and an optical low pass filter 210 for removing high frequency components from the subject light flux is arranged behind this infrared cut filter 209. A CCD 221 as an image sensor is arranged behind the optical low-pass filter 210, and the CCD 221 photoelectrically converts a subject image formed by the lenses 101a and 101b into electrical signals. The dust protection filter 205, infra-red cut filter 209, optical low pass filter 210 and the CCD 221 are integrally housed in a hermetically sealed passage, not shown, constructed so that dust can not infiltrate inside the package. In this embodiment, a CCD is used as an image acquisition section, but this is not limiting, and it is also perfectly possible to use a two-dimensional imaging element such as CMOS (Complementary Metal Oxide Semiconductor).

The CCD 221 is connected to an image sensor drive circuit 223, and is drive controlled by control signals from an input/output circuit 239. Photoelectric analog signals output from the CCD 221 are amplified by the image sensor drive circuit 223 and subjected to analog to digital conversion (AD conversion). An image sensor drive circuit 223 is connected to an image processing circuit 227 provided as an image processing section inside an ASIC (Application Specific Integrated Circuit) 262. This image processing circuit 227 executes various image processing such as digital amplification of digital image data (digital gain adjustment processing), color correction, gamma (γ) correction, contrast correction, monochrome/color mode processing, live view display processing etc. The image processing circuit 227 is connected to a data bus 261. Besides the image processing circuit 227, components such as a body CPU 229, functioning as a control section for controlling overall sequence of operations for the camera, a compression and expansion circuit 231, a video signal output circuit 233, an SDRAM (Synchronous Dynamic Random Access Memory) control circuit 237, an input/output circuit 239, a communication circuit 241, a storage medium control circuit 243, a flash memory control circuit 247, and a switch detection circuit 253, are connected to this data bus 261.

The body CPU 229 that is connected to the data bus 261 controls operation of this digital camera. Also, the compression and expansion circuit 231 connected to the data bus 261 is a circuit for compressing image data stored in the SDRAM 238 using JPEC, TIFF etc. The image compression is not limited to JPEG and TIFF, and it is also possible to apply other compression methods. The video signal output circuit 233 connected to the data bus 261 is connected via a liquid crystal monitor drive circuit 235 to a rear liquid crystal monitor 26 and an in-viewfinder liquid crystal monitor 29 (abbreviated to in-F liquid crystal monitor in the drawing). The video signal output circuit 233 converts image data stored in the SDRAM 238 or the storage medium 245 into video signals for display on the rear liquid crystal monitor 26 and/or the in-viewfinder liquid crystal monitor 29.

The rear liquid crystal monitor 26 is arranged on the rear surface of the camera body 20, but as long as it is in a position that can be seen by the photographer it is not limited to the rear surface, and also is not limited to liquid crystal and can be another display device. The in-viewfinder liquid crystal monitor 29 is arranged at a position that can be seen by the photographer through the viewfinder eyepiece, and similarly to the rear liquid crystal monitor 26 is not limited to liquid crystal and can be another display device. Incidentally, it is also possible to do away with the viewfinder eyepiece and the in-viewfinder liquid crystal monitor 29, and have only the rear liquid crystal monitor 26 for observing subject images.

The SDRAM 238 is connected via the SDRAM control circuit 237 to the data bus 261, and this SDRAM 238 acts as a buffer memory for temporarily storing image data that has been subjected to image processing by the image processing circuit 227 or image data that has been compressed by the compression and expansion circuit 231. The input/output circuit 239 is connected to the above described dust protection filter drive circuit 211, shutter drive mechanism 213, movable mirror drive circuit 215, ranging/light measurement processing circuit 219 and image sensor drive circuit 223, and controls input and output of data to various circuits, such as the body CPU 229 via the data bus 261. The communication circuit 241 that is connected to the lens CPU 111 via the communication contact 300 is also connected to the data bus 261, and carries out data exchange with the body CPU 229 etc. and communication for control commands.

The storage medium control circuit 243 connected to the data bus 261 is connected to the storage medium 245, and performs control of storage such as image data to this storage medium 245. The storage medium 245 is constructed so as to be capable of holding a rewritable storage medium (memory card), and is inserted into to or removed from the camera body 20 Besides this, as the storage medium 245 it is also possible to have a structure capable of connecting a hard disk unit or a wireless communication unit.

The flash memory control circuit 247 connected to the data bus 261 is connected to a flash memory 249, and this flash memory 249 stores programs for controlling flow of camera operations, and the body CPU 229 performs control of the digital camera in accordance with the programs stored in the flash memory 249. Incidentally, the flash memory 249 is an electrically rewritable non-volatile memory.

Various switches 255, such as a power switch 257 for turning the camera on and off linking to a power on switch lever for controlling supply of power to the camera body 20 and the lens barrel 10, a switch linking to the shutter release button, a switch linking to the playback button for instructing playback mode, a switch linking to a cross shaped button for instructing movement of a cursor on the screen of the rear liquid monitor 26, a switch linking to the mode dial for instructing exposure modes, an OK switch linking to the OK button for deciding various selected modes etc. and an attachment detection switch 259, are connected to the data bus 261 via a switch detection circuit 253.

Incidentally, the release button has a first release switch that turns on if the photographer presses the button down halfway, and a second release switch that is turned on when the button is pressed down fully. If this first release switch (hereafter called 1R) is turned on, the camera carries out exposure preparation operations such as focal point detection, focusing of the photographing lens, and light measurements for the subject brightness, and when the second switch (hereafter called 2R) is turned on, the camera carries out an exposure operation out to acquire image data for a subject image based on output of the CCD 221, as an image sensor.

Figure 2:
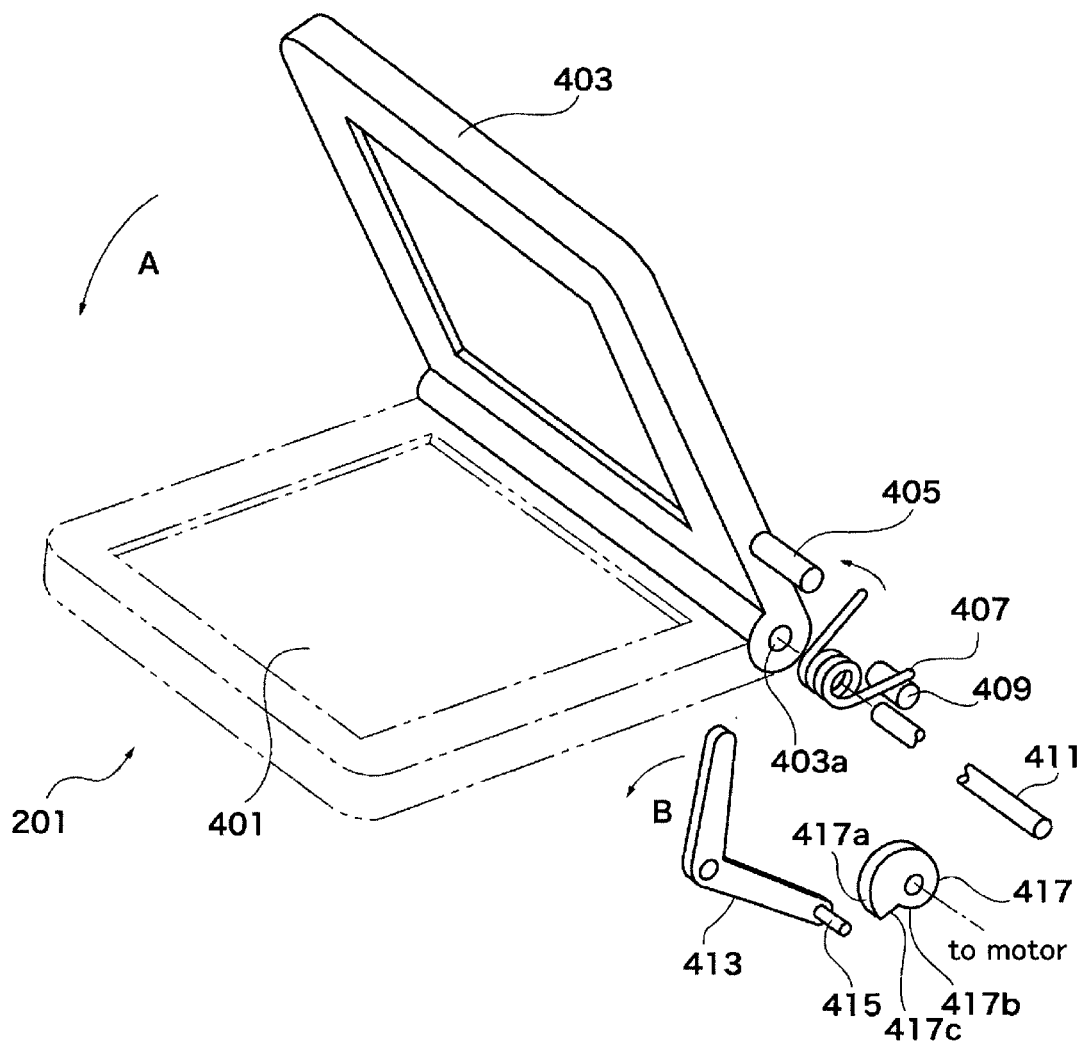
FIG. 2 is an exploded perspective view showing the structure a mirror member of the first embodiment adopting the present invention.

Next, drive means and retraction means for the movable mirror member 201 will be described using FIG. 2. A half mirror 401 for passing some of the subject light flux and reflecting part of the subject light flux is held by a mirror frame 403. This mirror frame 403 rotates freely about a shaft 411 inserted into a hole 403a, and a rotational shaft 201a (FIG. 1) is a central axis of the shaft 411. The two ends of a straight torsion spring 407 are respectively engaged with a pin 409 fixed to the camera body 20 and a drive pin 405 implanted in the mirror frame 403, and the coiled part of the torsion spring 407 is wound around the shaft 411. The mirror frame 403 is subjected to urging force in the anti-clockwise direction in FIG. 2 (direction of arrow A) by the spring force of the torsion spring 407. The drive pin 405 and one end of a latch lever 413 are engaged with each other, and a cam pin implanted in the other end of the latch lever 413 is inserted into a mirror cam 417.

The latch lever 413 is axially supported in the mirror box with the rotational center not shown in the drawing, and is subjected to urging force in an anti-clockwise direction (direction of arrow B) in the drawing by the spring force of the torsion spring 407 by means of the drive pin 405. Accordingly, the cam pin 415 of the latch lever 413 is pressed against the cam surface of the mirror cam 417. The cam surface of the mirror cam 417 is formed so that the length in a radial direction from the rotational center varies. Specifically, the mirror cam surface is formed so that at a latch position 417a on the cam surface, a distance from the rotational center is long, and at a latch release position 417b the distance from the rotational center is short compared to at the latch position 417a. The cam surface is formed having a stepped section 417c from the latch position 417a to the latch release position 417b in an anti-clockwise direction in the drawing, and the cam surface is formed so as to move smoothly from the latch release position 417b to the latch position 417a.

When the latch position 417a of the mirror cam 417 is at a position in contact with the cam pin 415, rotation of the latch lever 413 in the direction of arrow B is regulated by the mirror cam 417, and so the latch lever 413 holds the mirror frame 403 at a reflecting position. From this state, if the mirror cam 417 is rotated in a clockwise direction in the drawing, passing through the stepped section 417c to a position where the latch release position 417b is in contact with the can pin 415, rotation of the latch lever 413 becomes possible in the direction of arrow B. As a result, the mirror frame 403 is rotated and moved in the direction of arrow A to a retracted position by the urging force of the torsion spring 407. Incidentally, the mirror cam 417 is rotatively driven by a motor, not shown.

Drive means for driving the movable mirror member 201 to the reflection position in the exposure light path (position shown by solid lines in FIG. 2) in this way includes the mirror cam 417 and latch lever 413. Also, retraction means for driving the movable mirror member 201 to the retracted position out of the exposure light path (position shown by two-dot dashed line in FIG. 2) includes the torsion spring 407. The drive means and retraction means are not limited to this type of structure, and can have another structure as long as it is possible to drive the movable mirror member 201.

Since the movable mirror member 201 is constructed in this way, when the cam pin 415 has been driven to a position touching the latch release position 417b the mirror frame 403 and the latch lever 413 are rotated in the direction of arrow B by the urging force of the torsion spring 407, and the mirror frame 403 is placed at the retracted position as shown by the two-dot dashed line in the drawing. In this state, if the motor drives the mirror cam 417 and the latch position 417a is placed at a position touching the cam pin 415, the latch lever 413 is rotated in a clockwise direction (opposite direction to the direction of arrow B), and the mirror frame 403 is rotated in the clockwise direction (opposite direction to the direction of arrow A) by means of the drive pin 405 against the urging force of the torsion spring 407, to be positioned at the reflecting position as shown by the solid lines in the drawing.

Figure 3:
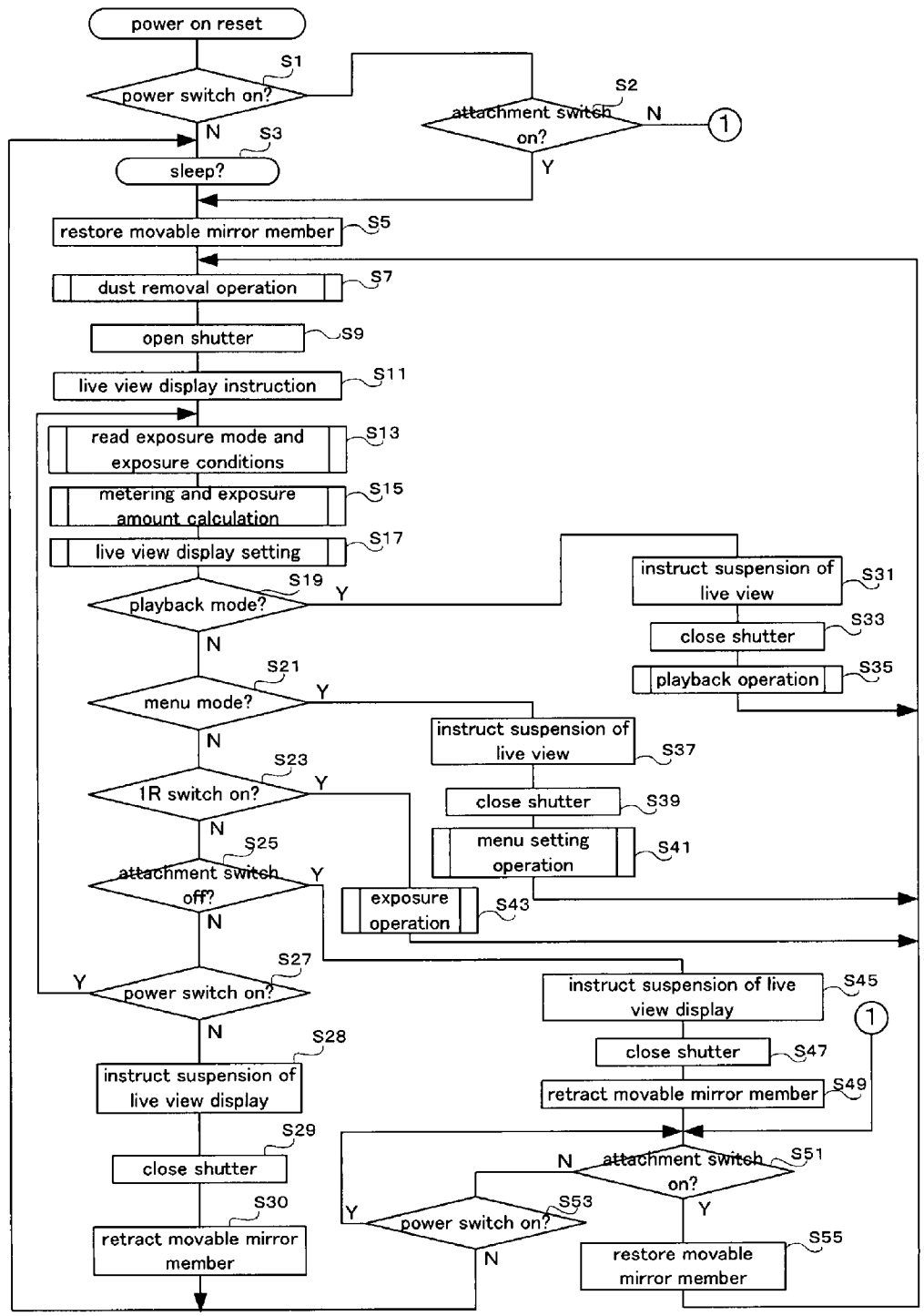
FIG. 3 is a flowchart showing a power-on reset operation of the first embodiment of the present invention.

Next, operation of the digital camera of a first embodiment of the present invention will be described using the flowcharts shown in FIG. 3 to FIG. 6. If the power on reset processing flow of FIG. 3 is entered, it is determined if the power switch 257 of the camera body has been turned on (S1). When the result of determination is that the power switch 257 is off, processing advances to step S3 where a sleep state, which is a low power consumption state, is entered. In this sleep state, interrupt processing is carried out only when the power switch 257 is turned on, and processing for power switch on is carried out in steps S5 and after. Until the power switch 257 is turned on, operations other than power switch interrupt processing are suspended, and consumption of the power supply battery is prevented.

In step S1, if the power switch 257 is turned on, processing advances to step S2 where it is determined whether or not the attachment switch 259 is off. As described previously, the attachment detection switch 259 is off if the lens barrel 10 is removed from the camera body 10. If the switch 259 is off, namely in the event that the lens barrel 10 is removed, processing advances to step S51 which will be described later. This is because when the power switch lever of the camera body 20 is operated with the lens barrel 10 removed, and the power is on, processing is the same as when the lens is removed. In step S2, if the attachment detection switch 259 is on, processing advances to step S5 and after, where power switch on processing is carried out.

In step S5, restoring of the movable mirror member 201 is carried out. When the power switch 257 is in the off state, the movable mirror member 201 is at a position retracted from the exposure light path (state shown by the two-dot dashed line in FIG. 2), but in response to the power switch 257 being turned on the subject light flux from the lens barrel 10 is conveyed to the range finder/photosensor 217 and light measurements and ranging are performed. Next, the dust removal operation for the dust protection filter 205 is carried out (S7). This is an operation to apply drive voltage to the piezoelectric element 207 attached to the dust protection filter 205 from the dust protection filter drive circuit 211, and remove dust using ultrasonic waves, as described previously.

Then, an opening operation for the shutter 203 is carried out by the shutter drive circuit 213 (S9). As a result, subject light flux that has passed through the moveable mirror member 201 is not shielded by the shutter 203 and a subject image is formed on the CCD 221. Commencement of live view display to give moving image display of a subject image on the rear liquid crystal monitor 26 using this image data formed with the CCD 221 is instructed (S11). Incidentally, control of the live view display operation is carried out by the image processing circuit 227 receiving this commencement instruction.

Next, if there is information such as exposure mode set by the mode dial, ISO sensitivity, shutter speed set manually, or aperture value, reading in of these exposure conditions is carried out (S13). Subject brightness is then measured by the range finder/photosensor 217, exposure amount is calculated, and exposure control values such as shutter speed and aperture value are calculated in accordance with exposure mode and exposure conditions, using this exposure value (S15). Also, live view display setting is carried out using the light measurement values and exposure amount etc. (S17). In this step, in order to carry out condition setting for electronic shutter speed and sensitivity when driving the CCD 221, calculation and setting is carried out in order to display an image having an appropriate brightness on the rear liquid crystal monitor 26 or the in-viewfinder liquid crystal monitor 29 using results of calculation for light measurement and exposure amount obtained in step S115, or a previous display image.

Next, processing advances to step S19 where determination as to whether or not playback mode is in effect is carried out. This playback mode is a mode for reading out still images stored in the storage medium 245 and displaying them on the rear liquid crystal monitor 26 and/or the in-viewfinder liquid crystal monitor 29, when the playback button has been operated. If the result of determination is that playback mode has been set, processing advances to step S31, and suspension of live view display is instructed to the image processing circuit 227. After that, an operation to close the shutter 203 is carried out (S33), still image data stored in the storage medium 245 is read out, image data is expanded by the compression and expansion circuit 231, and the still image is playback displayed on the rear liquid crystal monitor 26 and/or the in-viewfinder liquid crystal monitor 29 by means of the video signal output circuit 233 and the liquid crystal monitor drive circuit 235 (S35). When the release button is pressed down halfway, or any other manual operation is carried out during the playback operation, playback operation is terminated and processing returns to step S7 and the previously described operations are repeated.

In step S19, if playback mode has not been set, processing advances to step S21 where it is determined whether or not menu mode is set. This is determination as to whether or not the menu button has been operated and the menu mode set. If the result of determination is that menu mode has been set, then similarly to the case where playback mode was set, a live view suspension instruction is output (S37) and a close instruction is output to the shutter 203 (S39). After that, the menu setting operation is carried out (S41). Using the menu setting operation it is possible to carry out various setting operations, such as single frame shooting mode, speed priority sequential shooting mode, image quality sequential shooting mode, white balance, ISO sensitivity setting, drive mode setting etc. Incidentally, with respect to single frame mode or sequential shooting mode, single frame mode is set as a default value at the time of power on reset, and this setting can be appropriately changed according to the photographic intentions of the photographer. If the menu setting operation is completed, processing returns to step S7 and the operations described above are repeated.

If the determination result in step S21 is that menu mode has not been set, processing advances to step S23, where it is determined whether or not the release button has been pressed down halfway, that is, whether or not the 1R switch is on. If the result of determination is that the 1R switch is on, processing advances to step S43 where an exposure operation sub-routine is executed to carry out exposure preparation and exposure. This sub-routine will be described in detail later using FIG. 4. If the exposure operation sub-routine is completed, processing returns to step S7 and the steps described above are repeated.

If the result of determination in step S23 is that the 1R switch is off, processing advances to step S25 where, similarly to step S2, it is determined whether or not the attachment detection switch 259 is off. If the lens barrel 10 is detached then similarly to steps S31 and S33 for playback mode, a live view suspension instruction is output (S45), and a close operation for the shutter 203 (S47) is carried out. After that, an operation to retract the movable mirror member 201 from the optical path is carried out (S49). The retraction operation is carried out by driving the motor to rotate the mirror cam, thus causing the mirror frame 403 to be rotated from the exposure light path to the retracted position by the urging force of the torsion spring 407 (the position shown by the two-dot dashed line in FIG. 1 and FIG. 2, If retraction of the movable mirror member 201 is completed, and it was determined in step S2 that the attachment detection switch 259 is off (that is, that the lens barrel 10 is removed), processing advances to step S51 where it is determined whether or not the attachment switch 259 is on. After it has been detected in step S25 that the lens barrel 10 is removed, it is determined if the lens barrel 10 has been fitted again. If the determination result is that the lens barrel 10 has been fitted, processing advances to step S55 and the movable mirror member 201 is restored. As described previously, this restore operation involves rotating the mirror cam 417 by driving the motor, having the cam surface cause the latch lever 413 rotate in a clockwise direction against the urging force of the torsion spring 407, and placing the mirror frame 403 in the optical path of the lenses 101a and 101b. If the restoration of the movable mirror member 201 is completed, processing returns to step S7 and the steps described above are repeated.

In step S51, if the attachment detection switch 259 is turned off, processing advances to step S53 where it is determined whether or not the power switch 257 is on. In the event that the lens barrel 10 is removed and the power switch 257 is on, then the mount opening section remains open even if various operation buttons are operated, and so camera operations should not be carried out, in the interest of preventing erroneous operation. Therefore, a state is entered where determination of the attachment state of the lens barrel 10 in step S51, and the operation state of the power switch lever in step S53, are repeatedly carried out. If it is determined in step S53 that the power switch 257 is off, processing returns to step S3 and a sleep state is entered. Incidentally, it is also possible to modify the procedure so that, for example, in the event that it is detected in step S51 that the lens barrel 10 is still removed, the determination of step S53 is omitted and processing advances to step S3 to enter the sleep state, or processing advances to step S9 and operations are carried out based on operation of the various operation buttons.

If the result of determination in step S25 is that the attachment detection switch 259 is on, that is, that the lens barrel 10 is attached to the camera body, processing advances to step S27 where it is determined whether or not the power switch 257 is on. If the result of determination is that the power switch is on, processing returns to step S13 and the steps described above are repeated. After live view display has been started in step S11, unless there is operation of the various operation buttons etc. in step S19 and after, subject light flux that has passed through the movable mirror member 201 is not blocked by the shutter 203, and so a subject image is formed on the CCD 221, and image data formed by this CCD 221 is subjected to live view display as a moving image on the rear liquid crystal monitor 26 and/or the in-viewfinder liquid crystal monitor 29. If it is determined in step S27 that the power switch 257 is off, then an instruction is issued to the image processing section 227 to suspend live view display (S28), similarly to steps S31 and S33, and an operation to close the shutter 203 is carried out (S29). After that, similarly to step S49 described previously, after the retraction operation for the movable mirror member 201 has been carried out processing returns to step S3 and the sleep state is entered.

In this way, in this embodiment, with respect to a digital camera having a live view display function, at the time of power on the movable mirror member 201 is placed in the exposure light path, and some of the subject light flux is reflected to the range finder/photosensor 217, and so there is the advantage that it is possible to carry out light measurements and range finding immediately at the time of power on.

Also, in the power on reset routine, if the fact that the lens barrel 10 is removed is detected using the attachment detection switch 259 (S25), the movable mirror member 201 is retracted from the exposure light path, and if the fact that the lens barrel 10 is reattached is detected using the attachment detection switch 259 (S51), an operation is carried out to place the movable mirror member 201 in the exposure light path. Therefore, when the lens barrel 10 is removed and a state where the mount opening section is open is entered, then even if the user etc. inserts a cleaning tool or the like from the mount opening section the movable mirror member 201 is in the retracted state and so there is no problem of the movable mirror member 201 being damaged, or getting fingerprints on the movable mirror member 201.

Further, even in the event that the lens barrel 10 is removed at the time of power on, since the movable mirror member 201 is in the retracted state, similarly, there is no risk of the user etc, damaging or putting fingerprints on the movable mirror member 201. At the time of power on, since the movable mirror member 201 is placed in the exposure light path, it is possible to carry out the range finding and light measurement operations in parallel with the live view display operation.

Figure 4:
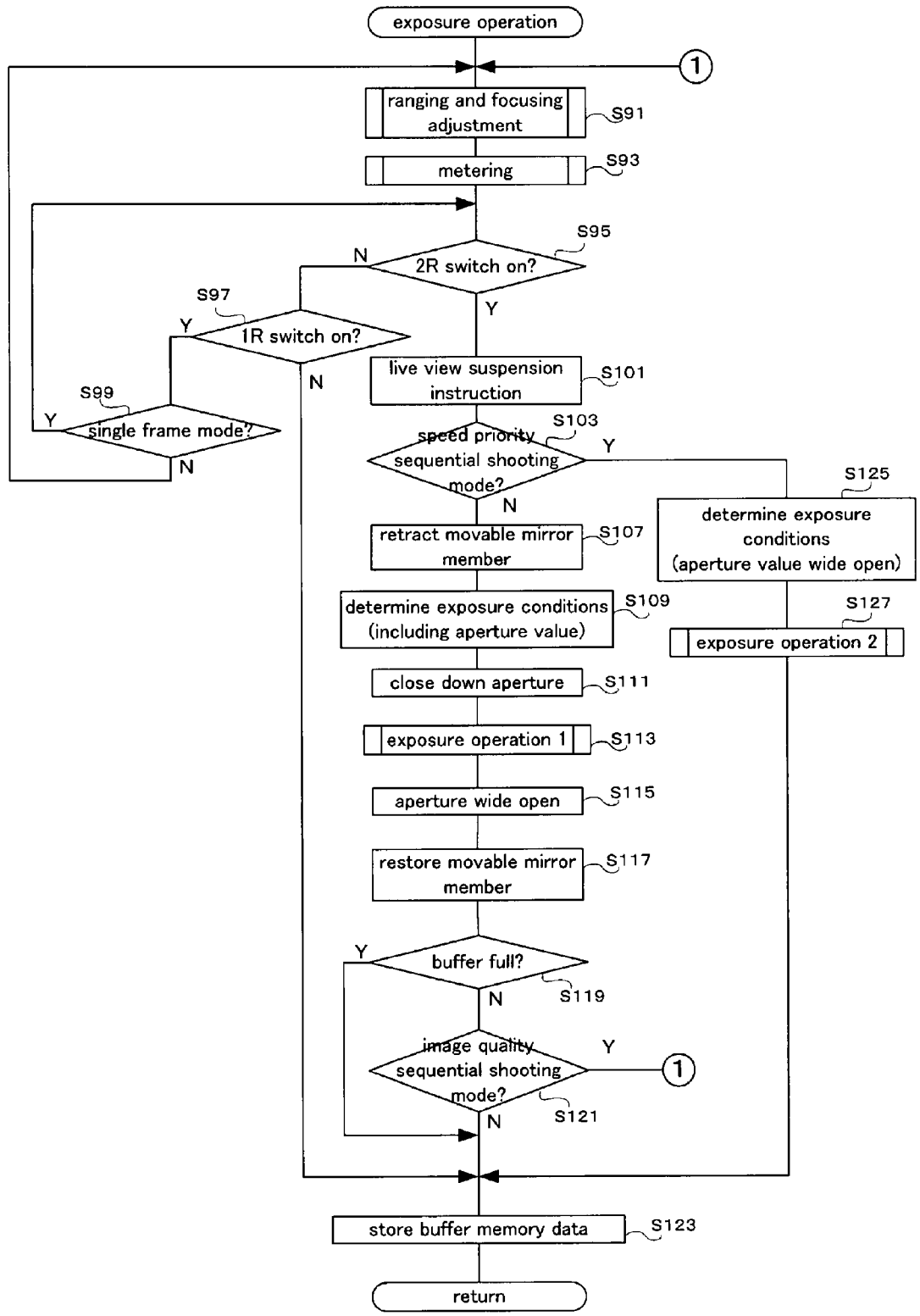
FIG. 4 is a flowchart showing an exposure operation of the first embodiment of the present invention.

Next, a sub-routine for the exposure operation of step S43 will be described using FIG. 4. As described previously, this sub-routine is executed when the release button is pressed down halfway. First, range finding and automatic focal point adjustment are carried out (S91). In step S5, by placing the movable mirror member 201 in the exposure light path and reflecting some of the subject light flux to the range finder/photosensor 217, the range finding/light measurement circuit 219 and CPU 229 etc. use this subject light flux to detect slip in focal point of the lenses 101a 101b, and the direction of slip, using a TTL phase different detection method, and the lenses 101a and 101b are then driven to a focus position by means of the lens CPU 111 using the optical system drive mechanism 107.

Next light measurement is carried out (S93). This also involves the range finder/photosensor 217 receiving subject light flux that has been reflected by the movable mirror member 201, and detecting subject brightness BV by processing using the ranging/light measurement circuit 219.

Next, it is determined whether or not the release button has been pressed down completely, that is, whether or not 2R switch is on (S95). If the result of determination is that the switch is off, processing advances to step S97 where it is detected whether or not the 1R switch is on. If the result of determination is that the 1R switch is on, processing advances to step S99 where it is detected whether or not single frame mode is selected. When the result of determination is that single frame mode has been set processing returns to step S95, and if single frame mode has not been set processing advances to step S91 and the previous described steps are repeated.

Specifically, if the release button is still pressed down halfway, and if single frame shooting mode has been set, a state is entered where the determinations in steps S95 to S99 are carried out repeatedly, and AF lock and AE lock are carried out. On the other hand, if single frame shooting mode has not been set (in the case of sequential shooting mode), a state where the steps S91 to S99 are repeatedly carried out is entered, and while this is going on range finding and light measurement are repeatedly carried out, and data is updated, without performing AF lock and AE lock. If the photographer lets go of the release button and 1R is turned off, processing returns to the power on reset step S7.

When the result of determination is step S95 is that the 2R switch is on, namely that the release button has been pressed down fully, an exposure operation is carried out in order to acquire a still image. First, in step S101, a suspend live view instruction is output to the image processing section 227. This is in order to prevent disruption to the subject image incident on the CCD 221 due to the operation of moving the movable mirror member 201 to the retracted position and the operation of opening and closing the shutter 203, and the live view image on the rear liquid crystal monitor 26 and/or the in-viewfinder liquid crystal 29 being unattractive, when acquiring a still image.

Next, determination as to whether or not the speed priority sequential shooting mode is set is carried out (S103). In this embodiment, there are two sequential shooting modes, namely speed priority sequential shooting mode and image quality priority sequential shooting mode. Speed priority sequential shooting mode is a sequential shooting mode where the number of sequential shots that can be taken per second is increased, and in order to do this subject images that have passed through the movable mirror member 201 are acquired with the movable mirror member 201 still placed in the exposure light path. Since there is no need to carry out the operations to retract and restore the movable mirror member 201 during sequential shooting, it is possible to carry out high speed sequential shooting. Also, in order to increase the speed, some range finding is carried out while taking photographs. On the other hand, image quality priority sequential shooting mode is a mode for carrying out sequential shooting while acquiring high quality image data. In order to do this, the movable mirror member 201 is retracted when acquiring images.

If the determination result in step S103 is that speed priority sequential shooting mode has not been set, that is, in the case of image quality sequential shooting mode or single frame shooting mode, the similarly to step S49 a retraction operation of the movable mirror member 201 is carried out (S107). If the retraction operation for the movable mirror member 201 is completed, determination of exposure conditions is carried out (S109). This is obtaining shutter speed TV and aperture value AV using light measurement values from step S93, by means of well known APEX calculation. Incidentally, in the event that it is not possible to acquire a suitable exposure value using shutter speed TV and aperture value AV, an appropriate exposure value is obtained by changing the ISO sensitivity SV.

Next, an operation to stop down the aperture 103 to a set aperture value or an aperture value calculated in step S109 is carried out using the aperture drive mechanism by means of the lens CPU 111 (S111). If the aperture stopping down operation is completed, an exposure operation 1 is then carried out using the CCD 221 (step S113). Specifically, since the movable mirror member 201 is moved to the retracted position, all of the subject light flux that has passed through the lenses 101a and 101b is formed into an image on the CCD 221. In this state, reset of the electronic shutter of the CCD 221 is released, and charge buildup of photoelectric conversion current for the subject image commences. If an exposure time that has been set manually in advance or set in step S103 has elapsed, the electronic shutter of the CCD 221 stops charge buildup for a photoelectric conversion signal. A subroutine for this exposure operation 1 will be described in detail later using FIG. 5. Incidentally, in the exposure operation 1 of step S113, exposure time has been controlled by the electronic shutter of the CCD 221, but this is not limiting and it is also possible to control the exposure time using the shutter 203. In this case, it is necessary to temporarily move the front curtain and rear curtain of the shutter 203 to initial positions before commencing the exposure operation.

Next, an instruction to open up the aperture 103 is output to the CPU 111, and the aperture 103 is opened up (S115). Next, similarly to step S5, a restore operation of the movable mirror member 201 is carried out (S117). If the movable mirror member 201 is restored, subject light flux that has passed through the photographing lens is again conveyed to the range finding sensor and the photosensor of the range finding/photosensor 217, thus making range finding and photometry possible. By issuing an image processing instruction, that will be described later, using the exposure operation 1, an image signal for charge accumulated in the CCD 221 is read out, image processing is carried out in the image processing circuit 221 etc. Further, after processing such as signal compression in the compression and expansion circuit 231, there is temporary storage of the image data acquired in the SDRAM 238, as a buffer memory. Accordingly, it is determined whether or not there is a state where storage region of the SDRAM 238 is already full, namely if there is no free storage region (S119).

If the result of determination is that the SDRAM 238 is not full, a determination is then carried out as to whether or not image quality priority sequential shooting mode has been set. If the result of determination is that image quality priority sequential shooting mode has been set, processing again returns to step S91 and exposures in sequential shooting mode are carried out by repeating the processing of the steps described above. Specifically, automatic focal point adjustment (S91) and light measurement and exposure value calculation (S93, S109) are carried out for every exposure using subject light flux reflected by the movable mirror member 201, and after that exposure is carried out, once the movable mirror member 201 has been retracted (S107, S113, S117).

If the result of determination in step S103 was that speed priority sequential shooting mode was not set, determination of exposure conditions is carried out (S125). In speed priority sequential shooting mode, as described previously, TTL phase difference detection ranging is carried out while performing the exposure operation. High precision TTL phase difference detection ranging is preferably carried out with the aperture open aperture, which means that exposure conditions in speed priority sequential shooting mode are different from exposure sequential of step S109, with appropriate exposure being obtained with aperture value AV set to open aperture, and varying and shutter speed TV. Incidentally, it is also possible to close down the aperture from open aperture according to the light measurement values obtained in step S93, within a range where it is possible to maintain precision of the phase difference detection ranging. It is also possible to vary ISO sensitivity SV in the event that appropriate exposure is not obtained by simply varying the shutter speed.

If exposure condition determination is complete, the sub-routine for exposure operation 2 is then carried out (S127). With this exposure operation 2, it is intended to shorten the time taken for an exposure by not advancing and retreating the movable mirror member 201 into and out of the exposure light path, and instead forming an image of subject light flux that has passed through the movable mirror member 201 while it is still placed in the exposure optical path. Reduction in time required for automatic focal point adjustment is also carried out a ranging integration operation at the same time as forming the subject image Further, with image quality priority sequential shooting mode, imaging was carried out by stopping down the aperture (S111), but with speed priority sequential shooting mode imaging is performed without the stopping down operation being carried out, or by only stopping down within a specified range, which is intended to increase the speed of sequential shooting together with improving the accuracy of TTL phase difference detection ranging. Further, after completion of the imaging operation and the ranging operation, focus drive is carried out in parallel with image processing, and storage operations for image signals read out by the imaging are carried out in parallel, based on results of ranging, which is intended to shorten the time taken. These operations will be described later using FIG. 6.

When the SDRAM 238, as a buffer memory, is full in step S119, or image quality priority sequential shooting mode is not set in step S121 (namely single frame shooting mode), or the exposure operation has been completed in step S127, a storage operation is carried out to write the image data temporarily stored in the SDRAM 238 to the storage medium 245 (S123). Once storing of the image data in the storage medium 245 is complete, processing returns to the power on reset routine.

Figure 5:
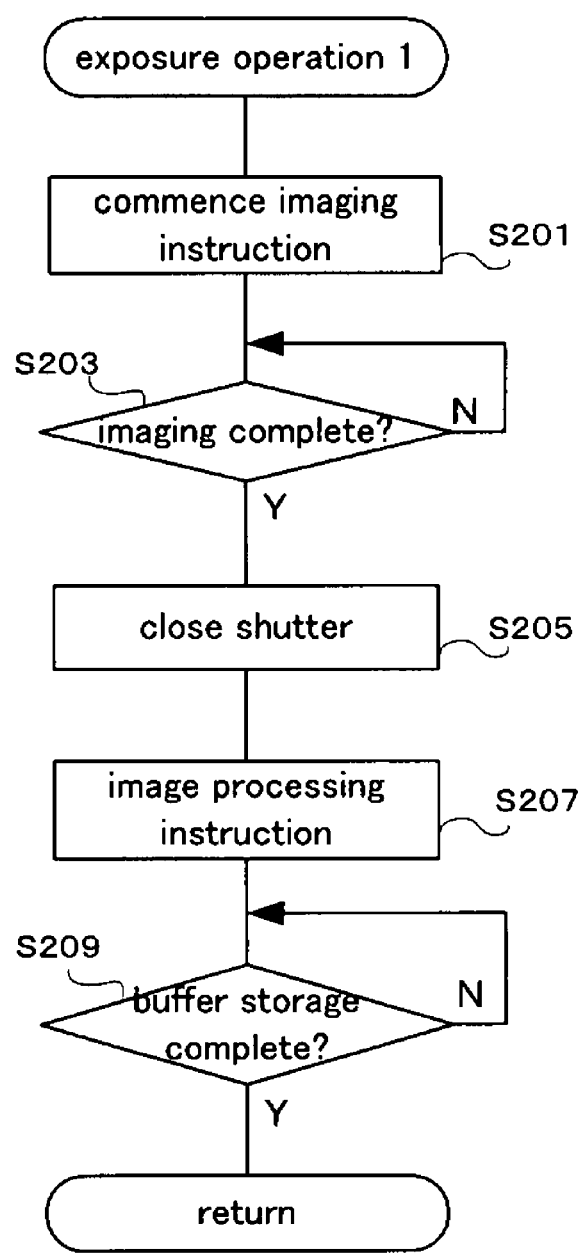
FIG. 5 is a flowchart of an exposure operation 1 of the first embodiment of the present invention.

Next, a sub-routine for the exposure operation 1 of step S113 will be described using FIG. 5. If this subroutine is entered, an imaging start command is output to the image sensor drive circuit 223 (S201). As a result of this command, the CCD 221 commences a photoelectric conversion operation for the subject image. It is determined whether an exposure time corresponding to a shutter speed set manually by the photographer or a shutter speed based on an exposure value obtained in step S109 has elapsed (S203), and if the exposure time has elapsed the shutter 203 is closed (S205).

If the operation of closing the shutter 203 is completed, next, image processing instructions are carried out in the image sensor drive circuit 223, the image processing circuit 227 and the compression and expansion circuit 231 etc. (S207). As a result of these instructions, image signals for charge accumulated in the CCD 221 are read out, image processing is carried out in the image processing circuit 227 etc., and processing such as image compression is performed in the compression and expansion circuit 231. After that, temporary storage of image data acquired in the SDRAM 238, as a buffer memory, is carried out, completion of buffer storage is awaited (S209), and once buffer storage is complete processing returns to the exposure operation routine.

Next, a sub-routine for the exposure operation 2 of step S127 will be described using FIG. 6. First, similarly to step S201, an imaging start command is output to the image sensor drive circuit 223 (S211). As a result, the CCD 221 commences a photoelectric conversion operation for the subject image. Next, a ranging operation is commenced (S213). The movable mirror member 201 remains in the exposure light path, which means that subject light flux that has been reflected by the movable mirror member 201 is conveyed to the range finder/photosensor 217, and an integration operation by the ranging sensor commences.

If the exposure operation and the ranging operation are started, it is then determined whether or not an exposure time has elapsed (S215). Here, it is determined whether or not an exposure time corresponding to a shutter speed set manually by the photographer or a shutter speed based on an exposure value obtained in step S125 has elapsed. If the determination result is that the exposure time has not elapsed, it is detected if the integration operation by the ranging sensor has completed (S241). If an integration value from an integration determination circuit inside the ranging/light measurement processing circuit 219 reaches a specified level, the ranging integration is completed and the completion is notified to the body CPU 229. If the ranging integration is not completed, processing returns to step S215, and a standby state is entered. That is, after commencement of the imaging operation and the ranging operation, if the exposure time has elapsed and the ranging integration is completed, processing advances to the next step.

If the exposure time has elapsed on step S215, an operation to close the shutter 203 is carried out (S217), and a stop imaging command for the CCD 221 is output to the image sensor drive circuit 223 (S219). In this state, the integration by the ranging sensor reaching a specified level, and completion of the ranging integration, is awaited (S221).

On the other hand, if the integration operation by the ranging sensor reaches a specified in step S241 and the ranging integration is completed, determination as to whether or not the exposure time has elapsed is carried out (S243), and if the exposure time has elapsed an operation to close the shutter 203 is carried out (S245), and an imaging stop command is output to the image sensor drive circuit 223 (S247). In this way, if the exposure time elapses range finding integration completion is awaited, while if range finding integration completes first elapse of the exposure time is awaited, and then processing transfers to the next step.

If ranging integration is completed in step S221, or the instruction to stop imaging in step S247 is finished, then similarly to step S207, an image processing instruction is executed (S223). Next, readout of raging data from the ranging sensor of the range finder/photosensor 217 is carried out and calculation of a defocus direction (direction of focus slip) and defocus amount (amount of focus slip) is carried out based on a well known TTL phase difference detection method (S225). Calculation of lens drive amount is carried out based on this defocus amount calculated value (S227), and the calculated lens drive amount and drive direction are sent to the lens CPU 111 (S229). The lens CPU 111 controls the optical system drive mechanism 107 based on the lens drive amount and drive direction to drive the lenses 101a and 101b to the focus position.

If transmission of the lens drive amount is complete, there is a communication from the lens CPU 111 that lens drive has been completed, and determination is carried out as to whether or not storage of image data to the buffer memory (SDRAM 238) carried out based on the image processing command in step S223 is completed (S231). If lens drive is complete and buffer storage is complete, it is next determined whether or not the release button has been pressed down fully, that is, whether or not 2R is on (S233). If the result of determination is that the 2R switch is off, sequential shooting in speed priority mode is terminated, processing returns to the subroutine for the exposure operation, and in step S123 the image data that has been stored in the buffer memory is stored in the storage medium 245.

On the other hand, if the result of determination is that the release button is pressed down fully, then in order to continue sequential shooting in the speed priority sequential shooting mode processing returns to step S211, but before that it is determined if there is free space in the buffer (SDRAM 238), namely that the buffer is not full (S251). If the result of determination is that the buffer memory is full, processing returns to the subroutine for the exposure operation, and in step S123 the image data that has been stored in the buffer memory is stored in the storage medium 245. If the buffer memory was not full in step S251, the shutter 203 is opened (S253), processing returns to step S211 to perform sequential shooting, and the previously described steps are repeated.

In this way, in the exposure 2 subroutine, while the release button is pressed down fully and the buffer memory is not full, imaging and range finding operations are carried out simultaneously with the movable mirror member 201 kept in the exposure light path, to repeat sequential shooting. In this embodiment, the shutter 203 is opened in step S253, and closed in steps S217 and S247, but during sequential shooting mode it is possible to increase the speed of sequential shooting if shutter speed control is carried out with the electronic shutter of the CCD 221 until the shutter 203 is opened.

In the first embodiment of the present invention as described above, in speed priority sequential shooting mode sequential shooting is carried out with the movable mirror member 201 kept in the exposure light path. There is therefore no need for the repeated retraction and returning of the movable mirror member 201 to and from the exposure light path, and it is possible to increase the speed of sequential shooting.

Also, in the first embodiment of the present invention, in speed priority sequential shooting mode ranging is carried out using subject light flux reflected by the movable mirror member 201. It is therefore possible to repeatedly perform ranging even during exposure in sequential shooting mode, and even if the subject distance varies it is possible to perform exposure at the correct focus.

Further, in the first embodiment of the present invention, in speed priority sequential shooting mode ranging integration is carried out in parallel with the exposure operation between exposure times. It is therefore possible to shorten the time taken by ranging, thus enabling an increase in speed of the sequential shooting overall.

Further, in the first embodiment of the present invention, in speed priority sequential shooting mode imaging is carried out with the open aperture, or at an aperture value in a range that does not reduce the ranging accuracy for phase difference detection AF. There is thus no reduction in the accuracy when carrying out ranging using phase difference detection AF. Incidentally, exposure value control can obtain appropriate exposure by varying shutter speed according to a set aperture value, varying ISO sensitivity depending on the situation, etc.

Also in the first embodiment of the present invention, after completion of ranging integration and an exposure operation for subject image acquisition, ranging calculations and lens drive, and image processing and image storage, are carried out in parallel, which means that it is possible to increase the speed of sequence shooting.

Further, with the first embodiment of the present invention, in image quality priority sequence shooting mode, the movable mirror member 201 is retracted from the exposure light path. It is therefore possible to avoid image degradation due to refractive index and thickness of the half mirror that may arise when light passes through the movable mirror member 201. Also, there is no reduction in the subject light amount by the half mirror, it is possible to increase the subject light amount when acquiring a still image, and it becomes possible to carry out exposure at a fast shutter speed.

Further, in the first embodiment of the present invention, ranging and focus drive are carried out by phase difference detection AF using subject light flux reflected from the movable mirror member 201. It is therefore possible to acquire images that are in focus even during sequential shooting. In particular, TTL phase difference detection AF has the advantage that followability is excellent even when the subject distance varies significantly.

Further, in the first embodiment of the present invention, when a still image is stored in sequential shooting, the position of the movable mirror member 201 is changed according to the intended image quality. That is, when storing a high quality image the movable mirror member 201 is retracted from the exposure light path, to prevent lowering of image quality attributable to the movable mirror member 201. Also, when storing a still image in high speed sequential shooting, the movable mirror member 2021 is kept in the exposure light path, and the time required to retract the movable mirror member 201 is saved, which is intended to shorten the time until exposure starts.

Further, in the first embodiment of the present invention, by placing the movable mirror member 201 in the optical light path at the time of camera operation and reflecting some of the subject light flux to the range finder/photosensor 217, there is the advantage that when the release button 21 is pressed down halfway and the 1R switch is on during live view display it is possible to immediately carry out light measurements and range-finding in parallel with live view display.

Incidentally, in the first embodiment of the present invention, two sequential shooting modes are provided, namely the speed priority sequential shooting mode and the image quality priority sequential shooting mode, but it is possible to have only the speed priority sequential shooting node. Also, a TTL phase difference detection method has been adopted as the ranging method, but this is not limiting and it is also possible to use a non-TTL triangulation range finding method, and in this case it is possible to perform an integration operation for triangulation ranging while forming an image using the image sensor.

Also with this embodiment the CCD 21, as the image sensor, receives light that has passed through the movable mirror member 201 and the range finder/photosensor 217 receives light that has been reflected by the movable mirror member 201, but it is also possible to have a structure where this is reversed ad the CCD 221 receives reflected light and the range finder/photosensor 217 receives passed light.

Next, a second embodiment of the present invention will be described using FIG. 7 to FIG. 11. In the first embodiment, the movable mirror member 201 that reflected some of the subject light and transmitted the remainder was movably constructed as a mirror section, and appropriately moved in or out of the optical path of the photographing lens as required. Contrasting with this, in the second embodiment the mirror section is fixed, and is always arranged in the optical path of the photographing lens. In the following, the second embodiment of the present invention will be described centering on the points of difference, with members that are the same as in the first embodiment being assigned the same reference numerals, and detailed description of those members omitted.

Figure 7:
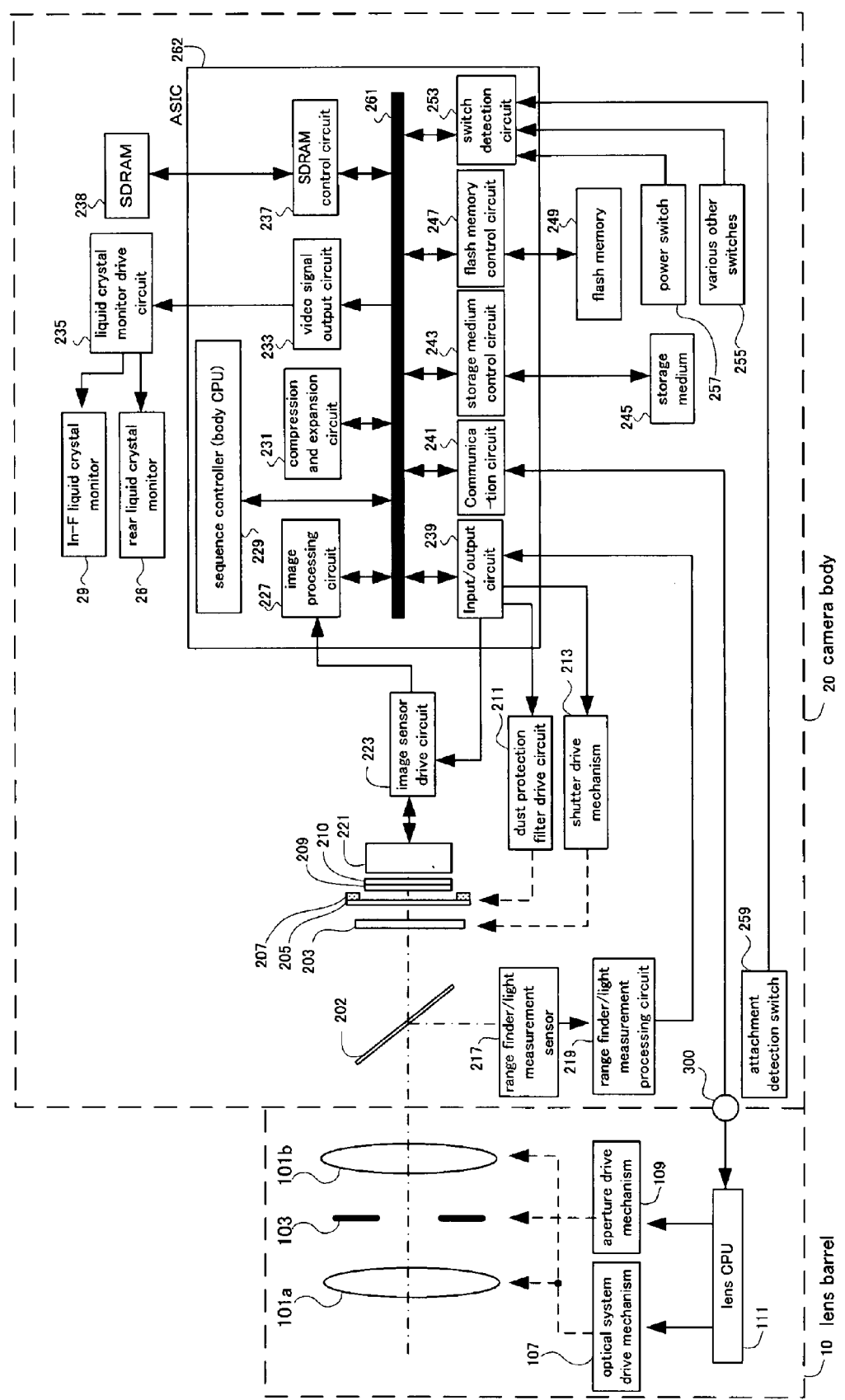
FIG. 7 is a block diagram showing the overall structure of electrical systems of a digital camera of a second embodiment adopting the present invention.

The structure of the second embodiment of the present invention will be described using the circuit block diagram shown in FIG. 7. In this embodiment, a fixed mirror section 202 is arranged instead of the movable mirror section 201 shown in FIG. 1, and accompanying this change to the mirror section the movable mirror drive mechanism 215 is omitted. Apart from this, the structure is the same as shown in FIG. 1.

The fixed mirror section 202 is fixedly arranged inside the mirror box inside the camera body 20, and has optical characteristics to transmit some of the light flux that has passed through the lenses 100a and 101b and reflect some of the light flux. This mirror section is constructed using a thin film mirror (Pericle mirror) or a glass mirror of 0.2 mm or less. Incidentally, the fixed mirror section 202 reflects part (for example 30%) of the subject light flux and passes part (for example 70%), but similarly to the first embodiment it is possible for the ratio of reflected light to passed light to have various values. Also, in FIG. 7 the fixed mirror section 202 is arranged so that subject light flux is reflected downwards in the mirror box, but this is not limiting and it is also possible to arrange the fixed mirror section 202 so that the subject light flux is reflected upwards or to the left or right.

Operation of the second embodiment of the present invention having this type of structure will be described using the flowcharts shown in FIG. 8 to FIG. 10. Flow control in this second embodiment is executed by the body CPU 229, similarly to the first embodiment. The flowchart of FIG. 8 corresponds to the power on reset routine of the first embodiment shown in FIG. 3. Points of difference from the first embodiment are that the returning and retracting operations of the movable mirror member 201 in steps S5, S30, S49 and S55 are obviated by the provision of the fixed mirror section 202 in this embodiment instead of the movable mirror member 201. Other than the points of difference described above, the flowchart shown in FIG. 8 is the same as the flowchart shown in FIG. 3, and so the same steps have the same reference numerals, with detailed description thereof being omitted.

Next, a sub-routine for the exposure operation of step S43 in FIG. 8 will be described using FIG. 9. The exposure operation subroutine shown in FIG. 9 is flow of operations corresponding to the exposure subroutine of the first embodiment shown in FIG. 4. Steps carrying out the same operations as in the flow of FIG. 4 have the same reference numbers and detailed description there of is omitted, with description centering on points of difference.

Figure 9:
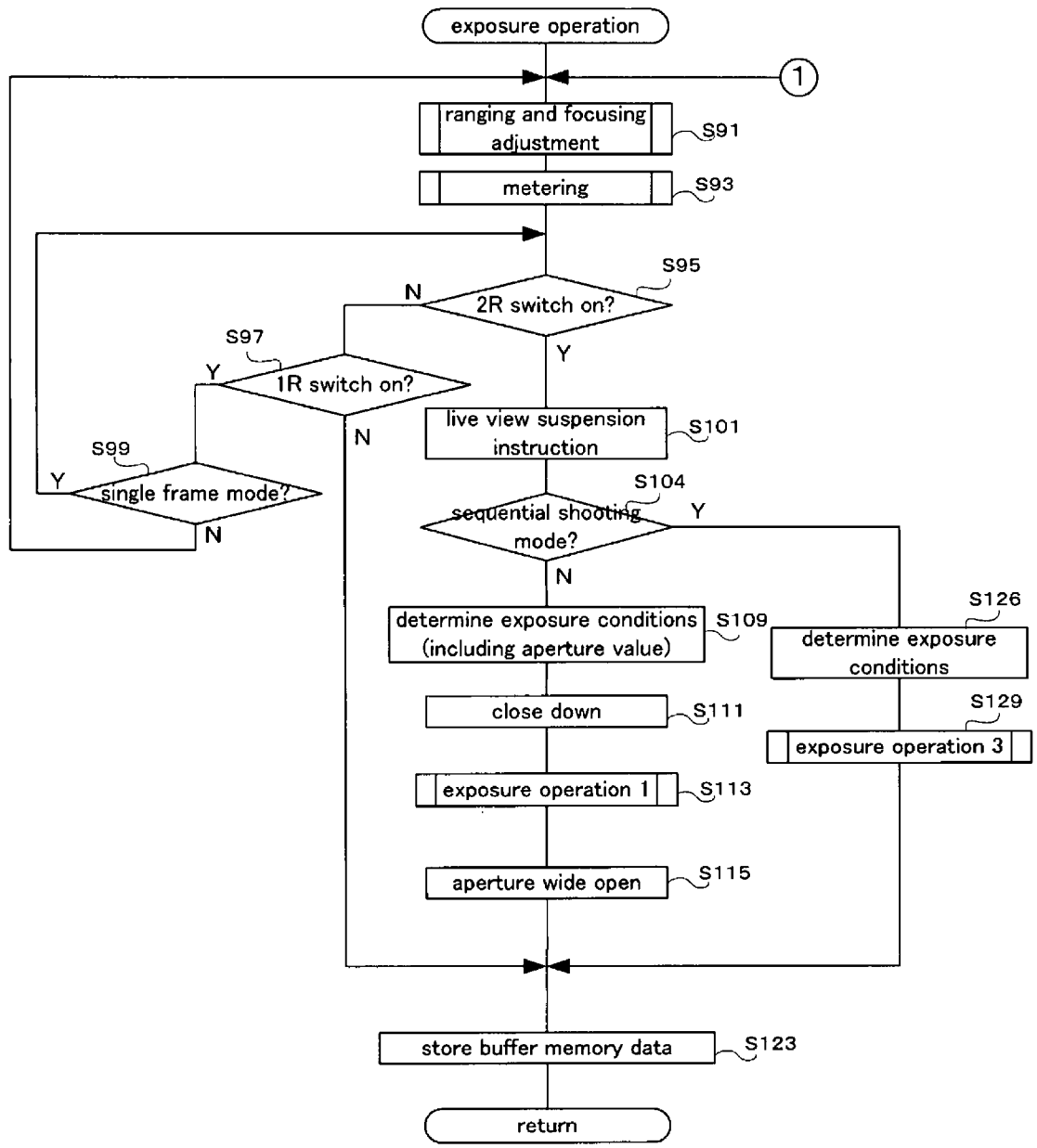
FIG. 9 is a flowchart showing an exposure operation of the second embodiment of the present invention.
Figure 10:
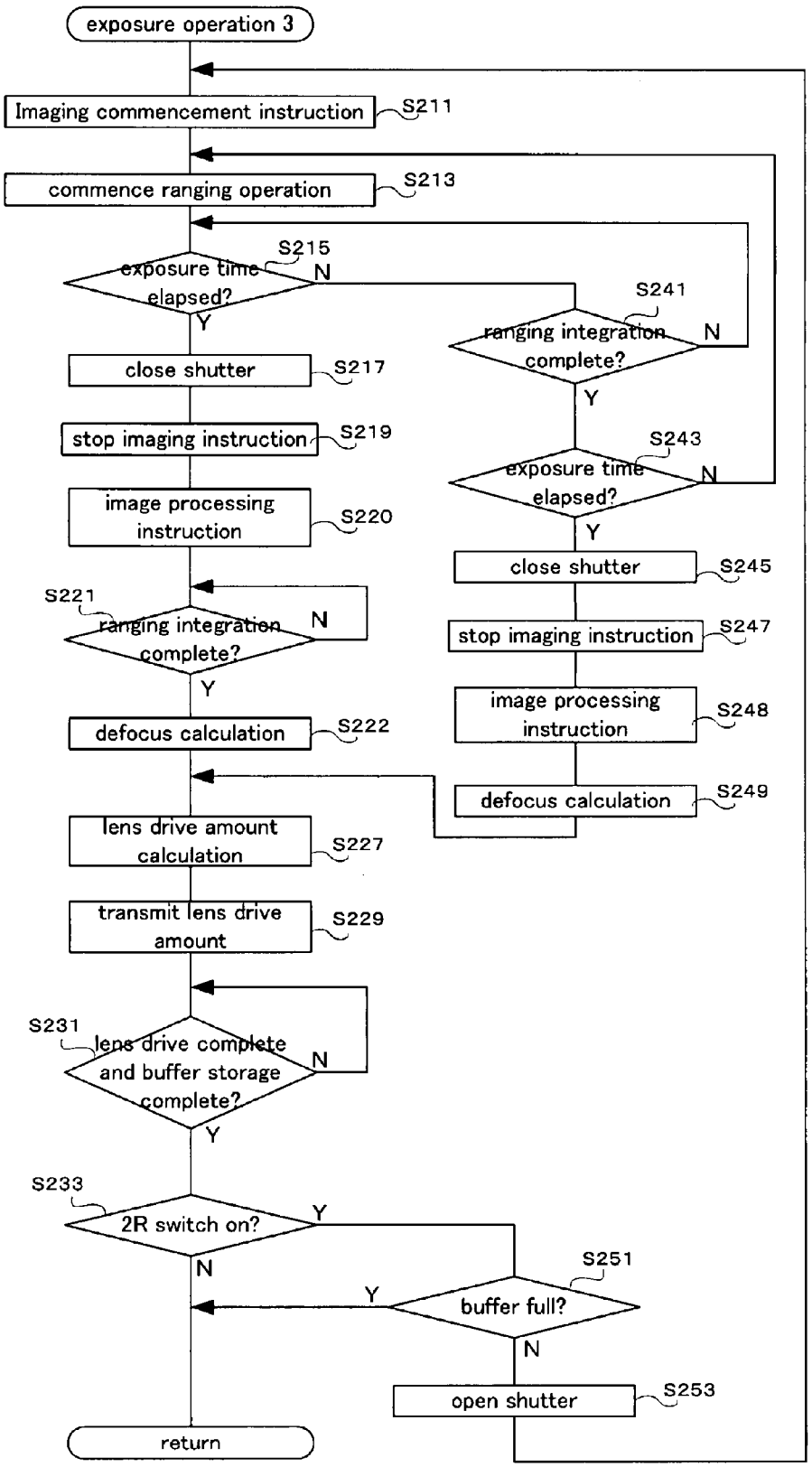
FIG. 10 is a flowchart of an exposure operation 3 of the second embodiment of the present invention.

If the photographer presses the release button down halfway, the flowchart shown in FIG. 9 is entered, ranging and focal point adjustment are carried out using the range finder/ photosensor 217 (S91), and light measurement is performed (S93). Next, it is respectively determined if the 2R switch is on (S95), if the 1R switch is on (S97) and if single frame shooting mode is selected (S99). If the 2R switch is on in step S95, live view display of the liquid crystal monitor 26 is stopped (S101).

If a live view stop instruction is performed, it is next determined whether or not sequential shooting mode has been selected (S104). In the first embodiment, two sequential shooting modes were adopted, namely the speed priority sequential shooting mode and the image quality priority sequential shooting mode, but in the second embodiment there is only one general purpose sequential shooting mode where shooting continues as long as the release button is pressed down fully.

When the determination result in step S104 is single frame shooting mode, determination of exposure conditions is carried out (S109), and after the aperture has been stopped down (S111) the above described exposure operation 1 (refer to FIG. 5) is executed (S113). In this manner, a subject image is subjected to photoelectric conversion by the CCD 221, being an image sensor, and image data is temporarily stored in the SDRAM 238. If the exposure operation 1 is completed, the aperture is opened up again (S115), image data that has been temporarily stored in the buffer memory (SDRAM 238) is stored in the storage medium 245 (S123), and the power on reset routine shown in FIG. 8 is returned to.

If the result of determination in step S104 was that sequential shooting mode was set, determination of exposure conditions is carried out (S1126). In the first embodiment, when determining exposure conditions, the aperture was set to an open aperture value, but in the second embodiment a value in a range from open aperture to F5.6 is used. Specifically, when an appropriate aperture value obtained from the exposure value is an aperture value smaller than F5.6 (using F stops, a value larger than 5.6), the aperture value is set to F5.6, and a shutter speed giving an appropriate exposure is again obtained.

The setting of the aperture value between open aperture and F5.6 in this way is because when carrying out focusing of the photographing lenses 101a and 101b, a so-called TTL phase difference detect (pupil division) method that uses light at the periphery of the photographing lens is adopted in this embodiment, and in order to ensure sufficient precision the aperture value is restricted to between the open aperture value and a limit aperture value at which range finding error does not occur. Incidentally, as a limit aperture value, F5.6 is used in this embodiment, but this is not limiting and it can be appropriately changed according to the range finding optical system for the TTL phase difference detection ranging.

Figure 8:
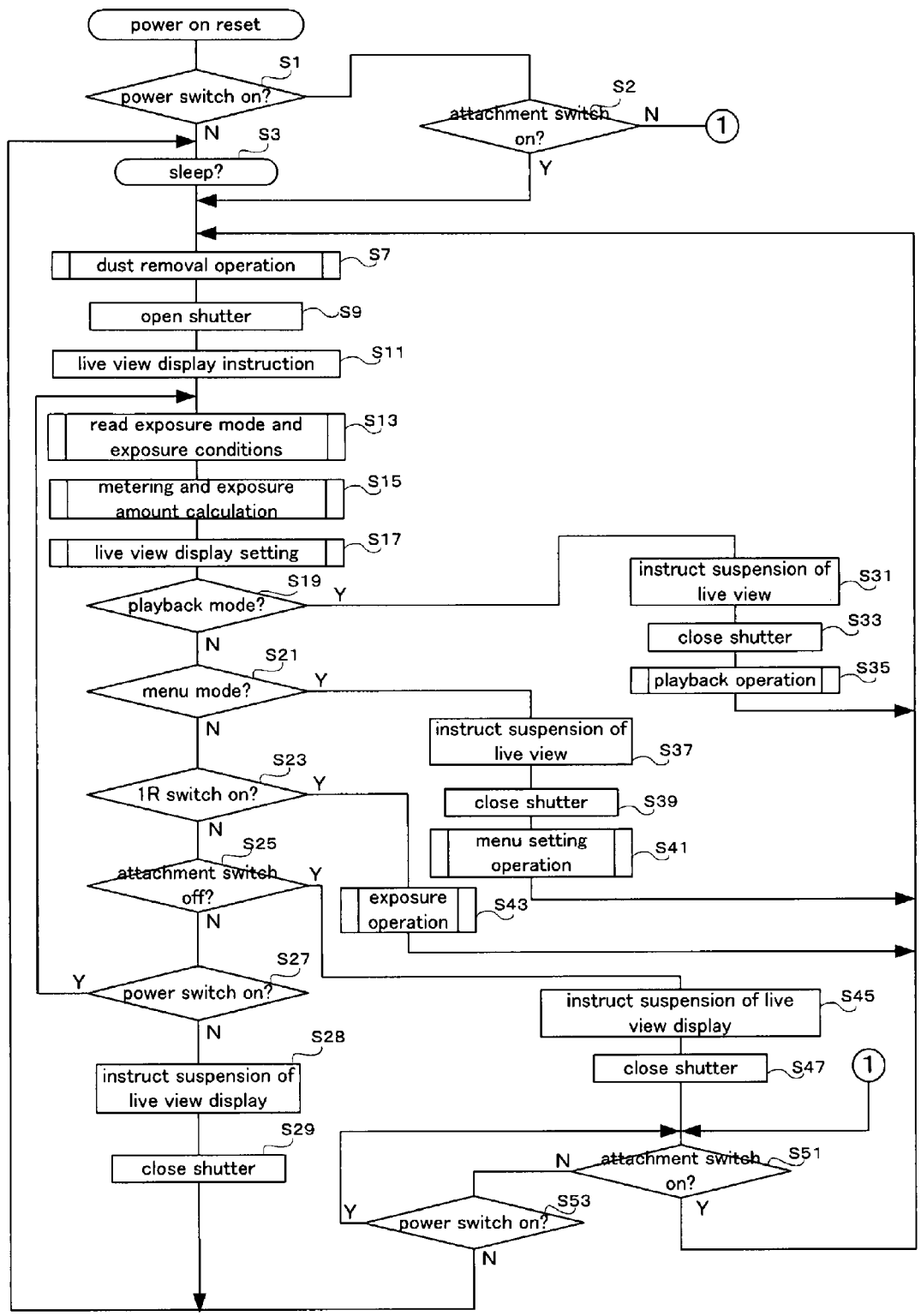
FIG. 8 is a flowchart showing a power-on reset operation of the second embodiment of the present invention.

If exposure conditions have been determined, next the exposure operation 3 for carrying out the exposure operations in sequential shooting is executed (S129), and once the exposure operation 3 is completed the power on reset routine shown in FIG. 8 is returned to after storing image data in the storage medium 245 in the previously described step S123.

Next, the exposure operation 3 of step S129 will be described using FIG. 10. This exposure operation 3 subroutine is flow analogous to the exposure operation 2 subroutine for the speed priority sequential shooting mode of the first embodiment (refer to FIG. 6). Steps carrying out the same operations as in the flow of FIG. 6 have the same reference numbers and detailed description there of is omitted, with description centering on points of difference.

Figure 6:
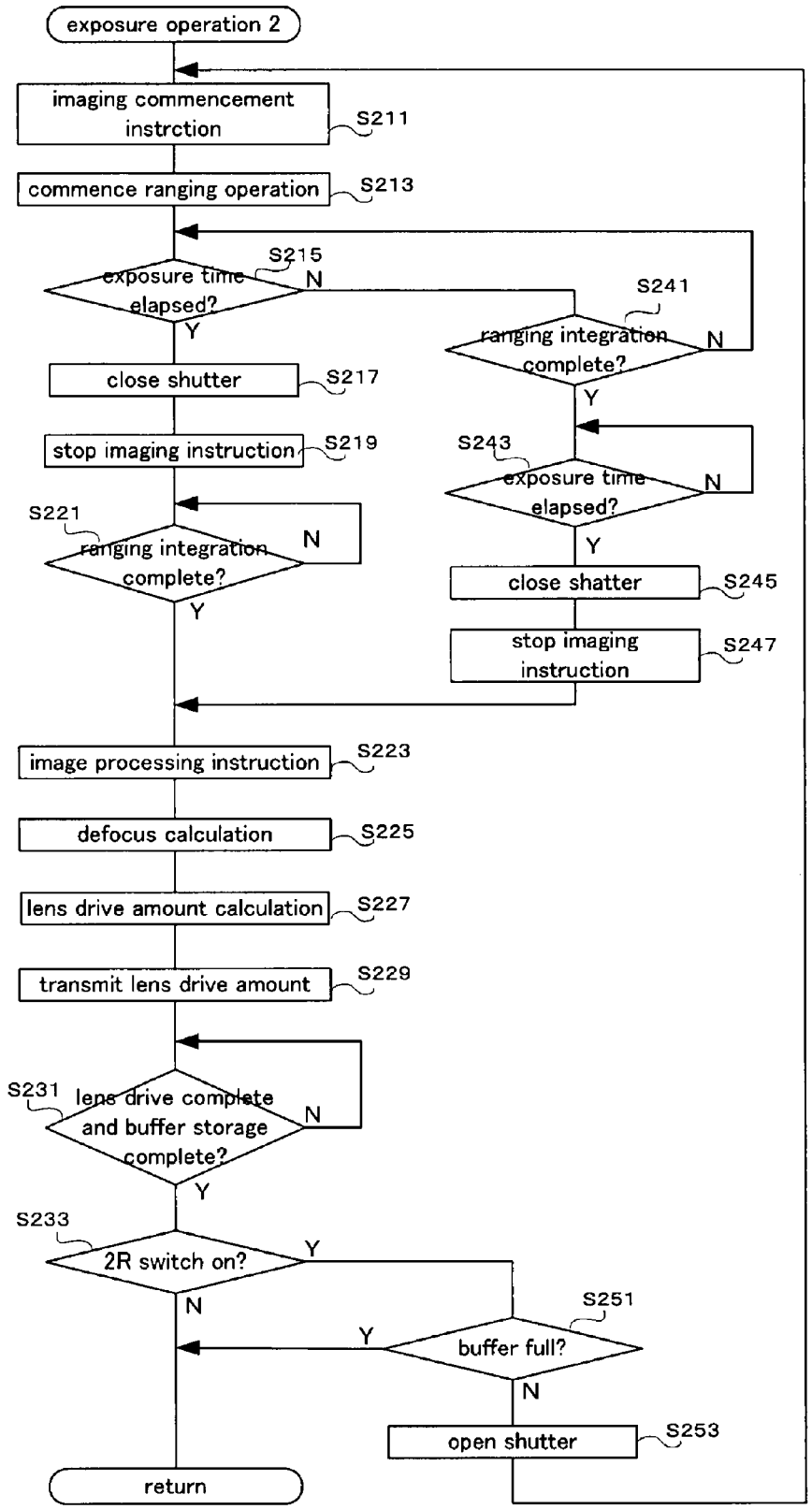
FIG. 6 is a flowchart of an exposure operation 2 of the first embodiment of the present invention.

If the exposure operation 3 subroutine is entered, then similarly to the flow of FIG. 6, together with outputting an instruction for imaging commencement (S211), the ranging operation is commenced (S213). Next, it is determined whether or not the exposure time determined in step S126 (refer to FIG. 9) has elapsed (S215), and if the result of determination is that the exposure time has not elapsed it is determined whether or not the ranging integration has completed (S241).

If the exposure time has elapsed before completion of ranging integration in step S215, an operation to close the shutter 203 is carried out (S217), and stop imaging is instructed (S219). After that, image signals are read out from the CCD 221, and image processing is instructed (S220). In the first embodiment, image processing was commenced after completion of ranging integration, but in the second embodiment starts after suspension of imaging without waiting for suspension of ranging integration. It is therefore possible to expect shortening of the processing time at the time of an exposure operation. Next, it is determined whether or not the ranging integration has completed (S221), and if ranging integration is complete calculation of defocus amount is carried out (S222).

Returning to step S241, if ranging integration is completed before lapse of the exposure time, it is next determined whether or not the exposure time has elapsed (S243). In the first embodiment, lapse of the exposure time is awaited in this step, but in the second embodiment if the exposure time has not elapsed, processing returns to step S213 and the ranging integration is started again. Specifically, in the first embodiment also, the ranging operation is carried out concurrently with the imaging operation, but this is done only once, whereas in the second embodiment, during the imaging operation, it is possible to repeatedly carry out the ranging operation concurrently as long as the exposure time has not elapsed.

In step S243, if the exposure time has elapsed, an operation to close the shutter 203 is carried out (S245), image formation suspension is instructed (S247), image signals are read out from the CCD 221, processing of images is instructed (S248), and calculation of a defocus amount is carried out (S249). Ranging integration is repeatedly carried out until the exposure time elapses, but the defocus amount calculation in step S249 is carried out based on the latest result of ranging integration.

Next, if calculation of defocus amount in step S222 or step S249 is complete, lens drive amount is calculated out based on the defocus amount calculated value (S227), and this calculated lens drive amount is transmitted to the lens CPU 111 (S229). The lens CPU 111 performs focus drive for the photographing lenses 101a and 101b based on the received lens drive amount.

Next, transmission of information indicating completion of the lens drive, and information indicating completion of temporary storage of image data in the SDRAM 238 from the lens CPU 111 is awaited (S231). Once both operations are completed, it is determined if the 2R switch is on (S233), and if the result of determination is that the switch is on a determination is then carried out as to if the buffer memory (SDRAM 238) for temporarily storing the image data is full, namely, whether or not free storage space has ran out (S251).

If the result of determination is that there is free space in the buffer memory, the front shutter curtain of the shutter 203 is moved (S253), processing returns to step S21 and the previously described operations are repeated. In step S233 if it is determined that the 2R switch is off, then since the photographer has taken their finger off the release button the sequential shooting mode is terminated and processing returns to the exposure operation routine of FIG. 9. Also, if it is determined in step S251 that the buffer memory is full, then since there is no free space in the SDRAM238, then even if an attempt is made to store image data in sequential shooting mode, the sequential shooting mode is terminated and processing returns to the exposure operation routine of FIG. 9.

Next, operation in the speed priority sequential shooting mode of the first embodiment and the sequential shooting mode of the second embodiment will be described using FIG. 11, while comparing the two operations. Incidentally, FIG. 11A shows the speed priority sequential shooting mode (exposure operation 2) of the first embodiment, while FIG. 11B shows operation of the sequential shooting mode (exposure operation 3) of the second embodiment.

Figure 11A:
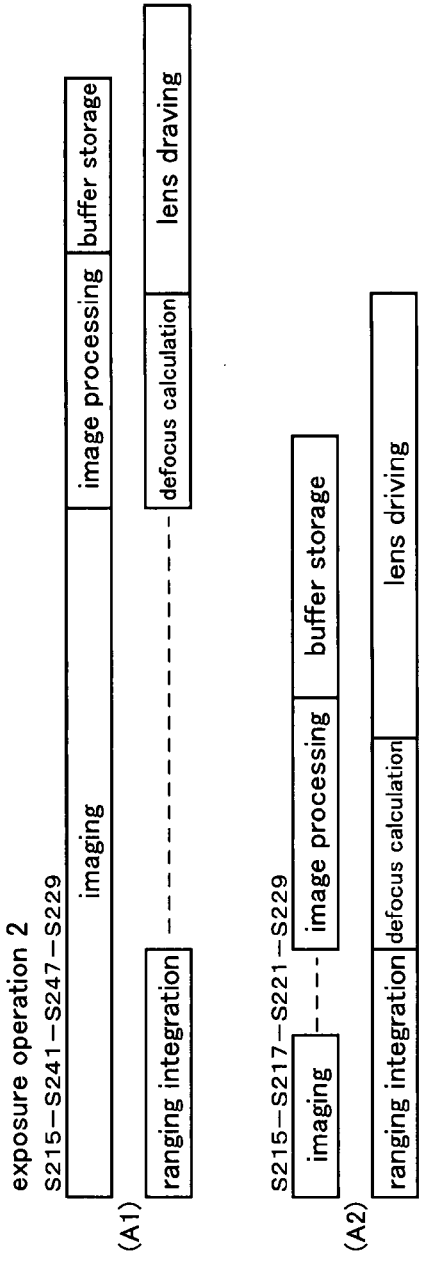
FIG. 11 is a chart showing comparison between the exposure operations of the first embodiment and the second embodiment of the present invention, with FIG. 11A showing the operations for speed priority sequential shooting mode of the first embodiment, and FIG. 11B showing operations for sequential shooting mode of the second embodiment.

The upper part (A1) of FIG. 11A is the case where ranging integration finishes first, and in this case ranging integration is carried out once during the exposure operation, and if the exposure operation is completed calculation of defocus amount and lens driving are carried out in parallel with image processing and buffer storage. Also, the lower part (A2) of FIG. 11A is the case where imaging finishes first, and if ranging integration is completed calculation of defocus amount and lens driving are carried out in parallel with image processing and buffer storage.

Figure 11B:
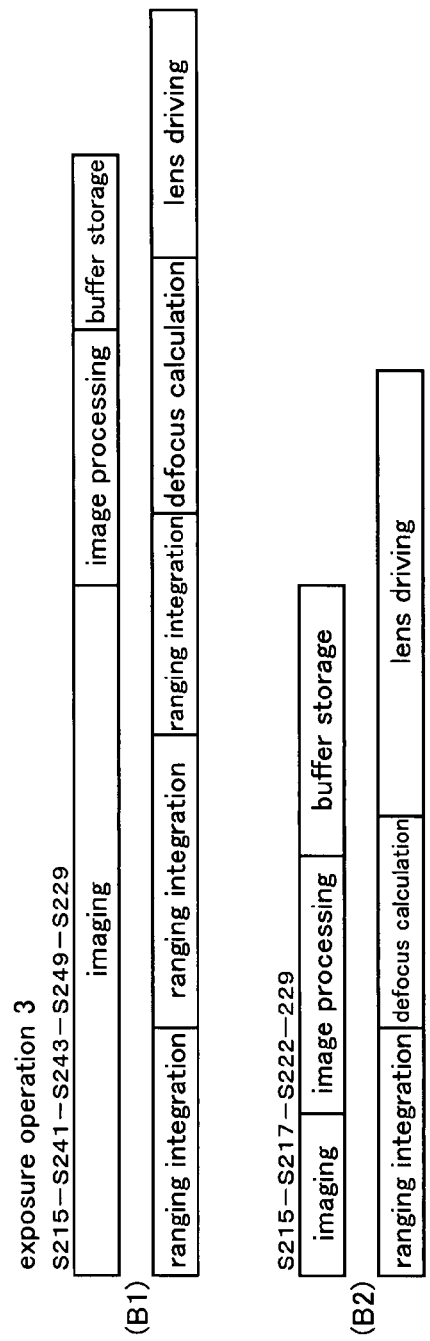

The upper part (B1) of FIG. 11(B) is the case where ranging integration is completed before the imaging operation in the exposure operation 3. In this case, ranging integration is repeated (three times in the example in the drawing), and once imaging is completed image processing and buffer storage are immediately sequentially executed, and once ranging integration is completed defocus calculation and lens drive are sequentially executed. Also, the lower part (B2) of FIG. 11B is the case where imaging finishes first, and if imaging is completed image processing and buffer storage are immediately sequentially executed without waiting doe completion of ranging integration. Similarly, once ranging integration is completed defocus amount calculation and lens drive are sequentially executed. However, in either case, during an exposure operation using the image sensor (photoelectric conversion operation), lens drive for automatic focal point adjustment of the photographing lens is prohibited.

As will be understood from FIG. 11A and FIG. 11B, in each of the embodiments of the present invention, ranging integration, defocus amount calculation and lens drive are executed in parallel with imaging, image processing and buffer storage. Therefore, in the first embodiment completion of the imaging operation or the ranging integration is awaited before execution of the next operation. Also, in the second embodiment, if each operation is completed the next operation commences immediately, and as a result it is possible to shorten overall processing time. Also, after completion of ranging integration and completion of the imaging operation, lens drive is performed based on a defocus amount. As a result, the lens is driven during the imaging and focal point adjustment operations, and there is no disruption of an image used for storage, or ranging becoming impossible.

As described above, in the second embodiment of the present invention, in the event that the imaging operation completes before the ranging integration operation, ranging integration is repeatedly carried out during that time. By performing defocus calculation based on results of the final ranging integration, focusing is made easy and out of focus situations are reduced, even if the subject moves.

Also, in the second embodiment, by carrying out ranging using some of the subject light flux reflected by the fixed mirror section 202 even if an imaging operation is in progress, it is possible to immediately take a photograph that is in focus even if there is a subsequent exposure after imaging completion. The effects are particularly exhibited in the case of sequential shooting, and it becomes possible to improve sequential shooting speed.

Also, in this embodiment, in the event that ranging integration is completed before the imaging operation, ranging integration is repeatedly carried out. It is therefore possible to carry out focal point detection based on the latest ranging integration data, and it is possible to make focusing easy and reduce out of focus situations.

Further, in the sequential shooting mode of this embodiment, the ranging sensor (range finder/photosensor 217) is activated during the imaging operation of the CCD 221, being an image sensor, and during image processing operations by the image processing circuit 227 etc. and writing of image data to the buffer memory (SDRAM 238), focal point adjustment by the lens CPU 11 and the optical system drive circuit 107 is active. Specifically, by carrying out the focal point adjustment operation only during image processing, only during storage to the buffer, or only while both operations are in progress, processing speed for sequential shooting mode is increased and it becomes possible to increase sequential shooting speed.

Further, in this embodiment, as the fixed mirror member 202 a thin film mirror or a glass mirror of 0.2 mm or less is fixed in the optical path of the photographing lens. There are therefore no movable sections, and it is possible to achieve the effect of making it difficult to break, together with simplifying the structure.

Further, with this embodiment, when determining exposure condition in step S129 (refer to FIG. 9), an aperture value is set in a range from an open aperture value to a specified aperture value. As a result it is possible to ensure ranging accuracy by the TTL phase difference detection method (pupil division), while at the same time increasing the degree of freedom of aperture value even with automatic exposure control.

Incidentally, in this embodiment, the fixed mirror section 202 is formed with a thin film mirror or glass mirror (of 0.2 mm or less) but this fixed mirror section 202 does not necessarily have to be a thin film mirror or glass mirror, and it is also possible to fixedly arrange a prism or the like having translucent characteristics on a partially reflecting surface. Specifically, any type of optical member can be used as long as it functions as a beam splitter to branch the subject light flux in a first direction and a second direction. There is also no problem if the light flux conveyed to the image sensor is not light flux that has passed through the mirror section, but light flux that is reflected by the mirror section. In this case, it is also possible for light flux that has passed through the fixed mirror section 202 to be conveyed to the range finder/photosensor 217.

Incidentally, having a similar structure to the first embodiment, the second embodiment also achieves the same effects, and it is also possible to implement the same modifications. The reverse is also true. With each of the embodiments of the present invention, the invention has been applied to a general digital camera, but this is not limiting and it is also possible to apply the invention to a digital camera inside various devices such as a mobile phone, and also can be applied to a dedicated digital camera attached to various devices such as microscope or binoculars. It is possible to adopt the present invention in any camera capable of storing exposure images in rapid succession.

What is claimed is:

1. A digital camera having a sequential shooting mode, the digital camera comprising:
    a photographing lens;
    an imaging section for photoelectrically converting subject light flux that has passed through the photographing lens and outputting subject image signals;
    an image processing section for processing the subject image signals to generate image data;
    a memory for storing the image data;
    a focal point detection section for photoelectrically converting the subject light flux to a photoelectric conversion signal, and for detecting a focal point of the photographing lens based on the photoelectric conversion signal;
    a focal point adjustment section for carrying out focal point adjustment of the photographing lens based on out of the focal point detection section; and
    a control section for, in a sequential shooting mode, (1) activating a photoelectrical conversion operation by the focal point detection section for a subsequent exposure operation in parallel with a photoelectrical conversion operation by the imaging section, and (2) activating, in parallel after completion of both the photoelectrical conversion operation by the focal point detection section and the imaging section, an image processing operation by the image processing section and a focal point detecting operation by the focal point detection section.

2. The digital camera of claim 1, wherein the focal point detection section carries out focal point detection based on a phase difference detection method.

3. The digital camera of claim 1, further comprisin an optical member, wherein the optical member is a mirror member having optical characteristics to transmit some of incident light flux, a first direction is a direction passing through the mirror member, and a second direction is a direction reflected by the mirror member, wherein the imaging section photoelectrically converts first subject light flux that has been conveyed in the first direction, and the focal point detection section photoelectrically converts second light flux that has been conveyed in the second direction.

4. The digital camera of claim 3, wherein the mirror member includes a thin film mirror or a glass mirror of 0.2 mm or less fixedly arranged in an exposure light path of the imaging section.

5. The digital camera of claim 1, wherein an aperture mechanism driven in response to control signals from the control section is provided inside the photographing lens, and an aperture value for the aperture mechanism in the sequential shooting mode is controlled to be in a range from an open aperture value to a specified aperture value.

6. The digital camera of claim 1, wherein the control section causes no execution of the focal point adjustment operation by the focal point adjustment section during the photoelectric conversion operation by the imaging section.

7. The digital camera of claim 1, wherein the control section causes operation of the focal point adjustment section upon completion of the focal point detection operation by the focal point detection section, and completion of the photoelectric conversion operation by the imaging section.

8. A control method for a digital camera having a sequential shooting mode, comprising:
    in a sequential shooting mode, carrying out an imaging operation of a subject image and a ranging integration operation in parallel; and
    after completion of both the imaging operation and the ranging integration operation, carrying out a processing operation for image signals acquired by the imaging operation, and a focal point adjustment operation based on ranging signal acquired by the ranging integration operation, in parallel.

* * * * *